US008749793B2

(12) United States Patent
Wang

(10) Patent No.: US 8,749,793 B2
(45) Date of Patent: Jun. 10, 2014

(54) APPARATUS AND METHODS FOR PERFORMING RAMAN SPECTROSCOPY IN SCATTERING MEDIUM

(75) Inventor: Sean Xiaolu Wang, Wilmington, DE (US)

(73) Assignee: BWT Property, Inc., Newark, DE (US)

( * ) Notice: Subject to any disclaimer, the term of this patent is extended or adjusted under 35 U.S.C. 154(b) by 198 days.

(21) Appl. No.: 13/359,758

(22) Filed: Jan. 27, 2012

(65) Prior Publication Data
US 2012/0194814 A1 Aug. 2, 2012

Related U.S. Application Data

(60) Provisional application No. 61/437,030, filed on Jan. 28, 2011.

(51) Int. Cl.
*G01J 3/45* (2006.01)
(52) U.S. Cl.
USPC .......................................... 356/451; 356/301
(58) Field of Classification Search
USPC .................. 356/301, 317–318, 417, 446; 250/458.1–461.2
See application file for complete search history.

(56) References Cited

U.S. PATENT DOCUMENTS

| 5,796,112 A * | 8/1998 | Ichie .......................... 250/458.1 |
| 8,248,600 B2 * | 8/2012 | Matousek et al. ............ 356/301 |
| 2007/0146699 A1 * | 6/2007 | Wang et al. ..................... 356/301 |
| 2008/0243002 A1 * | 10/2008 | Munce et al. .................. 600/459 |
| 2010/0328657 A1 * | 12/2010 | Dholakia et al. .............. 356/301 |
| 2011/0122416 A1 * | 5/2011 | Yang et al. ..................... 356/457 |

OTHER PUBLICATIONS

Generating Bessel beams with a tunable acoustic gradient index of refraction lens, Optical trapping and Optical Micromanipulation III, eds. K. Dholakia and G. Spalding, International Society for Optical Engineering (SPIE) vol. 6326, 6326IF (2006) (Tsai).*
E. McLeod and C. B. Arnold, "Optical Analysis of Time-Averaged Multiscale Bessel Beams Generated by a Tunable Acoustic Gradient Index of Refraction Lens," Applied Optics, vol. 47, pp. 3609-3618, 2008.
I. M. Vellekoop and A. P. Mosk, "Focusing coherent light through opaque strongly scattering media," Optics Letters, vol. 32, pp. 2309-2311, 2007.

* cited by examiner

*Primary Examiner* — Tarifur Chowdhury
*Assistant Examiner* — Jonathon Cook

(57) ABSTRACT

An improved apparatus and method for performing Raman spectroscopy in a scattering medium, where the scattering induced phase modulation is compensated by using a spatial light modulator to shape the wavefront of the laser beam. This allows the laser beam to be focused to a spot inside the inhomogeneous material with low distortion, thus stimulating Raman signal from the focus point for spectral analysis.

4 Claims, 2 Drawing Sheets

APPARATUS AND METHODS FOR PERFORMING RAMAN SPECTROSCOPY IN SCATTERING MEDIUM

REFERENCE TO RELATED APPLICATION

This application claims an invention which was disclosed in Provisional Patent Application No. 61/437,030, filed Jan. 28, 2011, entitled "APPARATUS AND METHODS FOR PERFORMING RAMAN SPECTROSCOPY IN SCATTERING MEDIUM". The benefit under 35 USC §119(e) of the above mentioned U.S. Provisional Applications is hereby claimed, and the aforementioned applications are hereby incorporated herein by reference.

FIELD OF THE INVENTION

This invention generally relates to Raman spectroscopy, and more specifically to apparatus and methods for performing Raman spectroscopy in scattering medium.

BACKGROUND

Raman spectroscopy is an effective tool for material characterization and identification, in which monochromatic light (usually laser light) interacts with molecular vibrations, phonons, or other excitations in the material, resulting in a frequency shift of the laser light. This frequency shift reveals information about the composition of the material. In an inhomogeneous material (e.g. biological tissue) which has spatial variation in its optical properties, the penetration depth of the laser light is very limited due to a high scattering loss. As a result, the application of Raman spectroscopy has conventionally been restricted to surface analysis. To analyze substance that lies below the surface layer of an inhomogeneous material, one has to increase the penetration depth of laser light in the highly scattering medium.

SUMMARY OF THE INVENTION

It is thus the goal of the present invention to provide an improved apparatus and method for performing Raman spectroscopy in a scattering medium, where the scattering induced phase modulation is compensated by using a spatial light modulator to shape the wavefront of the laser beam. This allows the laser beam to be focused to a spot inside the inhomogeneous material with low distortion, thus stimulating Raman signal from the focus point for spectral analysis.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
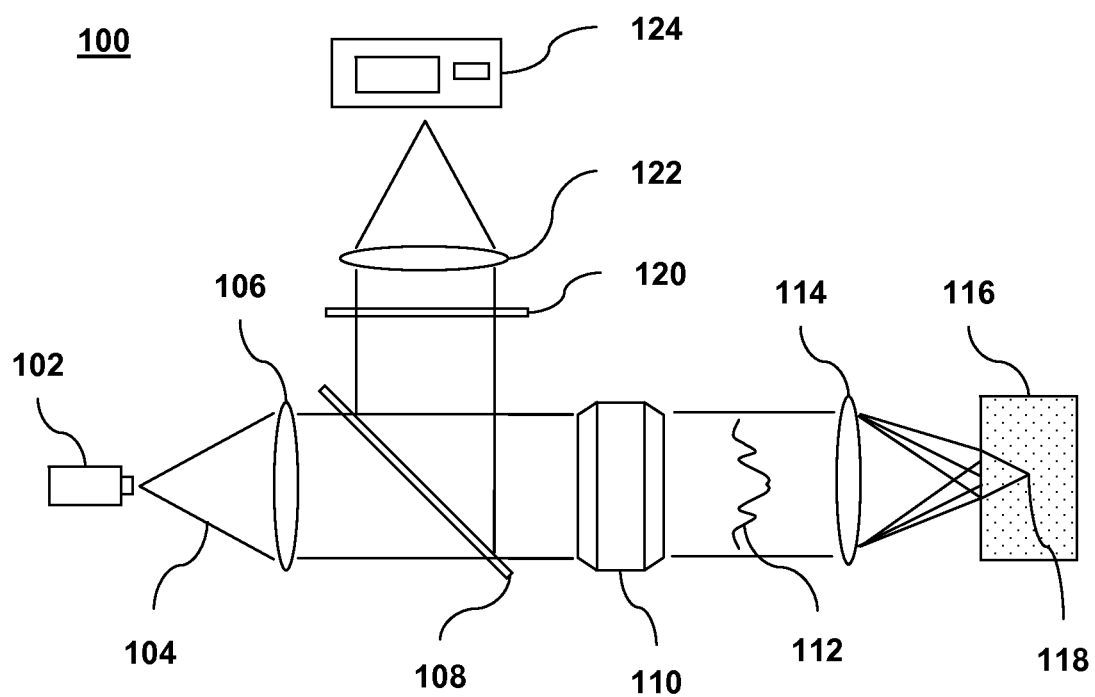
FIG. 1 illustrates a first exemplary embodiment of the Raman spectroscopic apparatus, which utilizes a tunable acoustic gradient-index (TAG) lens to produce a focus of the laser beam in the scattering medium.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to performing Raman spectroscopy in scattering medium. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

A first exemplary embodiment of the Raman spectroscopic apparatus is shown in FIG. 1. The Raman spectroscopic apparatus 100 comprises a laser light source 102 for producing laser light 104. The laser light 104 is collimated by a first optical lens 106 and passes through a dichroic beam splitter 108 to be modulated by a spatial light modulator 110. The spatial light modulator 110, which is a tunable acoustic gradient-index (TAG) lens in this exemplary embodiment, is used to shape the wavefront of the laser beam. The TAG lens consists of a cylindrical piezoelectric shell driven at ultrasonic frequencies to generate acoustic waves in a transparent filling fluid (e.g. silicone oil). The acoustic wave induces an alteration of the refractive index inside the lens, which in turn produces a spatial phase modulation 112 onto the wavefront of the laser beam. The shape and magnitude of this phase modulation can be controlled by adjusting the drive frequency and voltage for the piezoelectric shell. This spatial phase modulation converts the laser beam from a Gaussian beam into a Bessel beam. The Bessel beam is a 'non-diffracting' beam having the capability of self-healing or self-reconstruction, i.e. the light beam can recover its initial intensity profile through constructive interference after being scattered or obscured by obstacles. The modulated laser beam passes through a second optical lens 114 to be focused into the inhomogeneous material 116. The strong scattering of the inhomogeneous material 116 randomly changes the direction of the laser light and produces a disordered phase modulation. This disordered phase modulation is compensated by the self-healing capability of the Bessel beam, allowing the laser light to interfere constructively inside the material 116, thus creating a focus point 118 at the desired depth. In a slight variation of the present embodiment, the TAG lens may be replaced by an axicon lens for producing a Bessel beam.

Referring back to FIG. 1, the laser light stimulates Raman scattering signal at the focus point 118. The Raman signal is then collected by the optical lens 114 and follows the opposite path of the laser light to pass through the TAG lens. In a similar way as described above, any disordered phase modulation of the Raman signal, which is induced by random scattering of the inhomogeneous material, is compensated by the phase modulation provided by the TAG lens. After the TAG lens, the Raman signal is reflected by the dichroic beam splitter 108 and then filtered by a longpass edge filter 120 to remove any Rayleigh scattering from the Raman scattering signal. The filtered Raman signal is focused by a third optical lens 122 into a CCD (charge-coupled device) array spectrometer 124 (or other types of spectrographs) for spectral analysis. The obtained Raman spectrum reveals information about the composition of the inhomogeneous material 116 at the desired depth.

Figure 2:
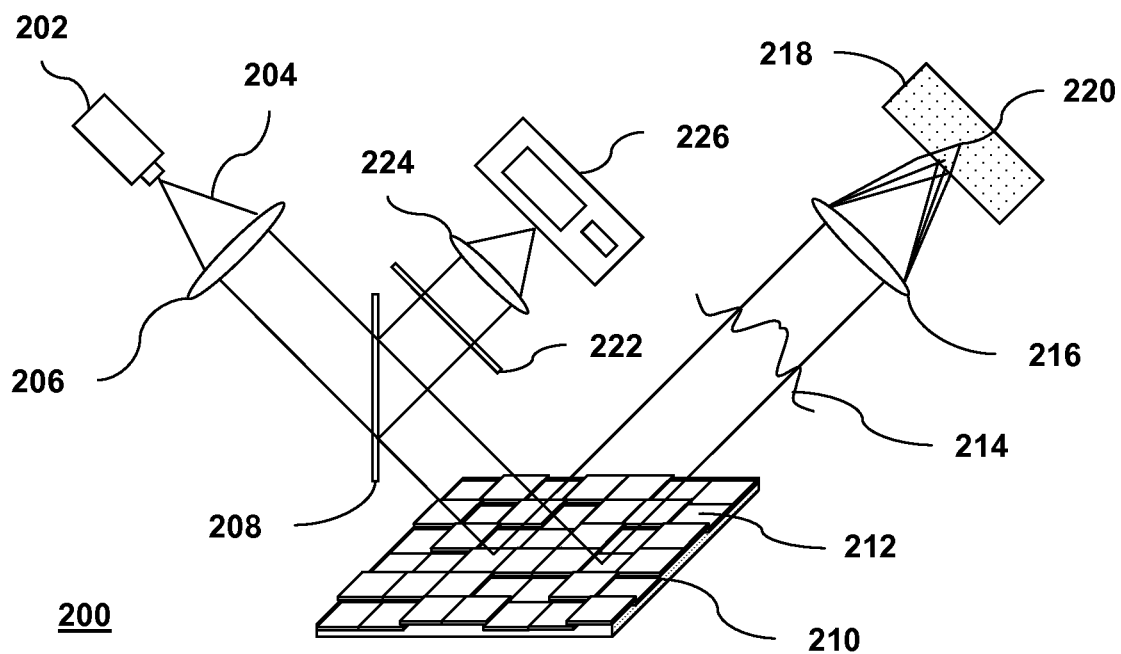
FIG. 2 illustrates a second exemplary embodiment of the Raman spectroscopic apparatus, which utilizes a liquid crystal or MEMS (Micro-Electro-Mechanical Systems) based spatial light modulator to produce a focus of the laser beam in the scattering medium.

A second exemplary embodiment of the Raman spectroscopic apparatus is shown in FIG. 2. The Raman spectroscopic apparatus has a similar configuration as shown in FIG. 1 except that the TAG lens is replaced by a liquid crystal or MEMS (Micro-Electro-Mechanical Systems) based spatial light modulator, which provides full digital control of the laser wavefront.

The Raman spectroscopic apparatus 200 comprises a laser light source 202 for producing laser light 204. The laser light 204 is collimated by a first optical lens 206 and passes through a dichroic beam splitter 208 to be modulated by a liquid crystal or MEMS based spatial light modulator 210. The spatial light modulator 210 comprises a plurality of individually controllable pixels 212, each pixel controlling the phase of a segment of the laser beam, thus producing a spatial phase modulation 214 onto the wavefront of the laser beam. The modulated laser beam passes through a second optical lens 216 to be focused into the inhomogeneous material 218. The strong scattering of the inhomogeneous material 218 randomly changes the direction of the laser light and produces a disordered phase modulation. This disordered phase modulation is compensated by the phase modulation provided by the spatial light modulator 210, allowing the laser light to interfere constructively inside the material 218 and produce a focus point 220 at the desired depth. The laser light stimulates Raman scattering signal at the focus point 220. The Raman signal is then collected by the optical lens 216 and follows the opposite path of the laser light to be modulated by the spatial light modulator 210. Any disordered phase modulation of the Raman signal, which is induced by random scattering of the inhomogeneous material, is compensated by the phase modulation provided by the spatial light modulator 210. After the spatial light modulator 210, the Raman signal is reflected by the dichroic beam splitter 208 and then filtered by a longpass edge filter 222 to remove any Rayleigh scattering from the Raman scattering signal. The filtered Raman signal is focused by a third optical lens 224 into a CCD array spectrometer 226 (or other types of spectrographs) for spectral analysis. The obtained Raman spectrum reveals information about the composition of the inhomogeneous material 218 at the focus point 220.

The same wavefront modulation technique as disclosed in the present invention may be used in other spectroscopic applications (e.g. fluorescence spectroscopy) for performing spectroscopic analysis inside a scattering medium.

In the foregoing specification, specific embodiments of the present invention have been described. However, one of ordinary skill in the art appreciates that various modifications and changes can be made without departing from the scope of the present invention as set forth in the claims below. The numerical values cited in the specific embodiment are illustrative rather than limiting. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A spectroscopic apparatus for performing spectroscopic measurement inside a scattering medium, the spectroscopic apparatus comprising:
   a laser light source for producing a laser beam;
   a liquid crystal or Micro-Electro-Mechanical-Systems (MEMS) based spatial light modulator for producing a spatial phase modulation onto a wavefront of said laser beam to produce a modulated laser beam;
   optical means for delivering said modulated laser beam into the scattering medium, wherein the scattering medium produces a disordered phase modulation onto said modulated laser beam, and wherein said liquid crystal or Micro-Electro-Mechanical-Systems (MEMS) based spatial light modulator is configured such that said disordered phase modulation is compensated by said spatial phase modulation to cause said modulated laser beam to interfere constructively inside the scattering medium and produce a focus point thereof to stimulate a spectroscopic signal; and
   a spectrograph for collecting and measuring said spectroscopic signal to obtain an optical spectrum of the scattering medium at said focus point.

2. The spectroscopic apparatus of claim 1, wherein said spectroscopic signal comprises a Raman scattering signal.

3. The spectroscopic apparatus of claim 1, wherein said spectroscopic signal comprises a fluorescence signal.

4. A method for performing spectroscopic measurement inside a scattering medium, the method comprising the steps of:
   providing a laser light source for producing a laser beam;
   providing a liquid crystal or Micro-Electro-Mechanical-Systems (MEMS) based spatial light modulator for producing a spatial phase modulation onto a wavefront of said laser beam to produce a modulated laser beam;
   delivering said modulated laser beam into the scattering medium, wherein the scattering medium produces a disordered phase modulation onto said modulated laser beam, and wherein said liquid crystal or Micro-Electro-Mechanical-Systems (MEMS) based spatial light modulator is configured such that said disordered phase modulation is compensated by said spatial phase modulation to cause said modulated laser beam to interfere constructively inside the scattering medium and produce a focus point thereof to stimulate a spectroscopic signal wherein said modulated laser beam interferes constructively to produce a focus point inside the scattering medium to stimulate a spectroscopic signal; and providing a spectrograph for collecting and measuring said spectroscopic signal to obtain an optical spectrum of the scattering medium at said focus point.

* * * * *